United States Patent
Tas (10) Patent No.: US 11,212,284 B2
(45) Date of Patent: Dec. 28, 2021

(54) METHOD TO VIRTUALIZE LARGE FILES IN A SANDBOX

(71) Applicant: Comodo Security Solutions, Inc., Clifton, NJ (US)

(72) Inventor: Egemen Tas, North Bergen, NJ (US)

(*) Notice: Subject to any disclaimer, the term of this patent is extended or adjusted under 35 U.S.C. 154(b) by 0 days.

(21) Appl. No.: 16/172,719

(22) Filed: Oct. 26, 2018

(65) Prior Publication Data
US 2019/0068601 A1    Feb. 28, 2019

Related U.S. Application Data (63) Continuation of application No. 14/860,395, filed on Sep. 21, 2015, now abandoned.

(60) Provisional application No. 62/053,336, filed on Sep. 22, 2014.

(51) Int. Cl.
| | | |
|---|---|---|
| *G06F 16/00* | (2019.01) | |
| *H04L 29/06* | (2006.01) | |
| *G06F 16/174* | (2019.01) | |
| *G06F 9/44* | (2018.01) | |

(52) U.S. Cl.
CPC .............. *H04L 63/10* (2013.01); *G06F 9/44* (2013.01); *G06F 16/174* (2019.01)

(58) Field of Classification Search
CPC ........... H04L 63/10; G06F 16/174; G06F 9/44
See application file for complete search history.

(56) References Cited

U.S. PATENT DOCUMENTS

| | | | |
|---|---|---|---|
| 6,185,575 B1 | 2/2001 | Orcutt | |
| 6,477,544 B1* | 11/2002 | Bolosky | ............... G06F 16/174 |
| 6,957,219 B1* | 10/2005 | Lin | ......................... H04L 67/06 |
| 7,793,266 B2 | 9/2010 | Alpern et al. | |
| 7,903,575 B2 | 3/2011 | Yoon et al. | |
| 8,224,796 B1 | 7/2012 | Shinde et al. | |
| 8,266,337 B2 | 9/2012 | Madruga et al. | |
| 8,453,145 B1 | 5/2013 | Naik | |
| 8,751,515 B1 | 6/2014 | Xing et al. | |
| 8,904,081 B1* | 12/2014 | Kulkarni | ............. G06F 9/45558 711/6 |
| 2002/0131423 A1* | 9/2002 | Chan | ................... H04L 67/1017 370/400 |
| 2004/0107314 A1 | 6/2004 | Kim et al. | |
| 2006/0288263 A1 | 12/2006 | Nakamura | |
| 2007/0294319 A1 | 12/2007 | Mankad et al. | |
| 2009/0043978 A1* | 2/2009 | Sawdon | .................. G06F 3/065 711/162 |
| 2009/0077327 A1 | 3/2009 | Hara | |
| 2010/0037235 A1 | 2/2010 | Larimore et al. | |

(Continued)

OTHER PUBLICATIONS

Luyi Xing, Xiaorui Pan, Rui Wang, Kan Yuan and Xiaofeng Wang Upgrading Your Android, Elevating My Malware: Privilege Escalation Through Mobile OS Updating Security and Privacy (SP), 2014 IEEE Symposium on May 18-21, 2014 Publisher: IEEE Conference Location: San Jose, CA, USA.

*Primary Examiner* — Shiow-Jy Fan (74) *Attorney, Agent, or Firm* — Joseph P. Aiena (57) ABSTRACT

There is provided a method and system with an improved bitmap access control method of file virtualization for large files in sandbox. The process divides a large file to pieces clusters by fixed byte counts, building a mapping relationship between logical view of sandboxed file and physical shadow file on disk. Thus, there is no need to copy an entire file when a file is modified and waste the user's disk storage.

3 Claims, 8 Drawing Sheets

(56) References Cited

U.S. PATENT DOCUMENTS

| | | | |
|---|---|---|---|
| 2010/0049930 A1* | 2/2010 | Pershin | G06F 11/1451 |
| | | | 711/162 |
| 2010/0306270 A1 | 12/2010 | McDiarmid et al. | |
| 2012/0030439 A1* | 2/2012 | Engelsiepen | G06F 16/128 |
| | | | 711/162 |
| 2012/0124306 A1* | 5/2012 | Abercrombie | G06F 11/1451 |
| | | | 711/162 |
| 2015/0142748 A1* | 5/2015 | Gottemukkula | G06F 11/1451 |
| | | | 707/649 |

* cited by examiner

METHOD TO VIRTUALIZE LARGE FILES IN A SANDBOX

CROSS REFERENCE TO RELATED APPLICATIONS

This application claims benefit of and priority to U.S. Provisional Application Ser. No. 62/053,336 filed on Sep. 22, 2014, and U.S. Non-provisional application Ser. No. 14/860,395, filed on Sep. 21, 2015, each of which are incorporated herein by reference in its entirety.

BACKGROUND

File virtualization is a very important part of sandbox process. Common sandbox methods usually create a shadow file to redirect file access in the sandbox. Through the shadow file method, a sandbox could build a separated environment from existing file system data. All access and operations on file in a sandbox are redirected to shadow files, thus does not change status and content of outside files.

Though the shadow file method has a problem about big and large file virtualization. Existing methods create shadow file once upon write operation happens in sandbox. It copies entire file to redirected location as shadow file. After creating shadow file, all access and modifications are redirected to shadow file. Even a single byte change in a large file results in a copy operation of entire file.

In view of the forgoing, there is a need for a method and system that would provide more effective approach to file virtualization by saving time and disk storage resources.

SUMMARY OF THE INVENTION

The current invention is a method and system to provide improved bitmap access control method of file virtualization for large file in sandbox.

The invention method eliminates duplication of data on shadow file and makes virtualization more effective. There is no need to copy an entire file when the file is modified, which is time-consuming and downgrades overall performance of the sandbox. Also, it does not require duplicating file on a disk which wastes a user's disk storage.

BRIEF DESCRIPTION OF DRAWINGS

FIG. 6 is a schematic of an individual user operating a computer or handheld device connected to the internet.

DETAILED DESCRIPTION

The present invention discloses the method of large file Virtualization in sandbox. The new method according to the present invention divides large file into pieces clusters by fixed byte counts, building a mapping relationship between logical view of sandboxed file and physical shadow file on disk.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

Figure 1:
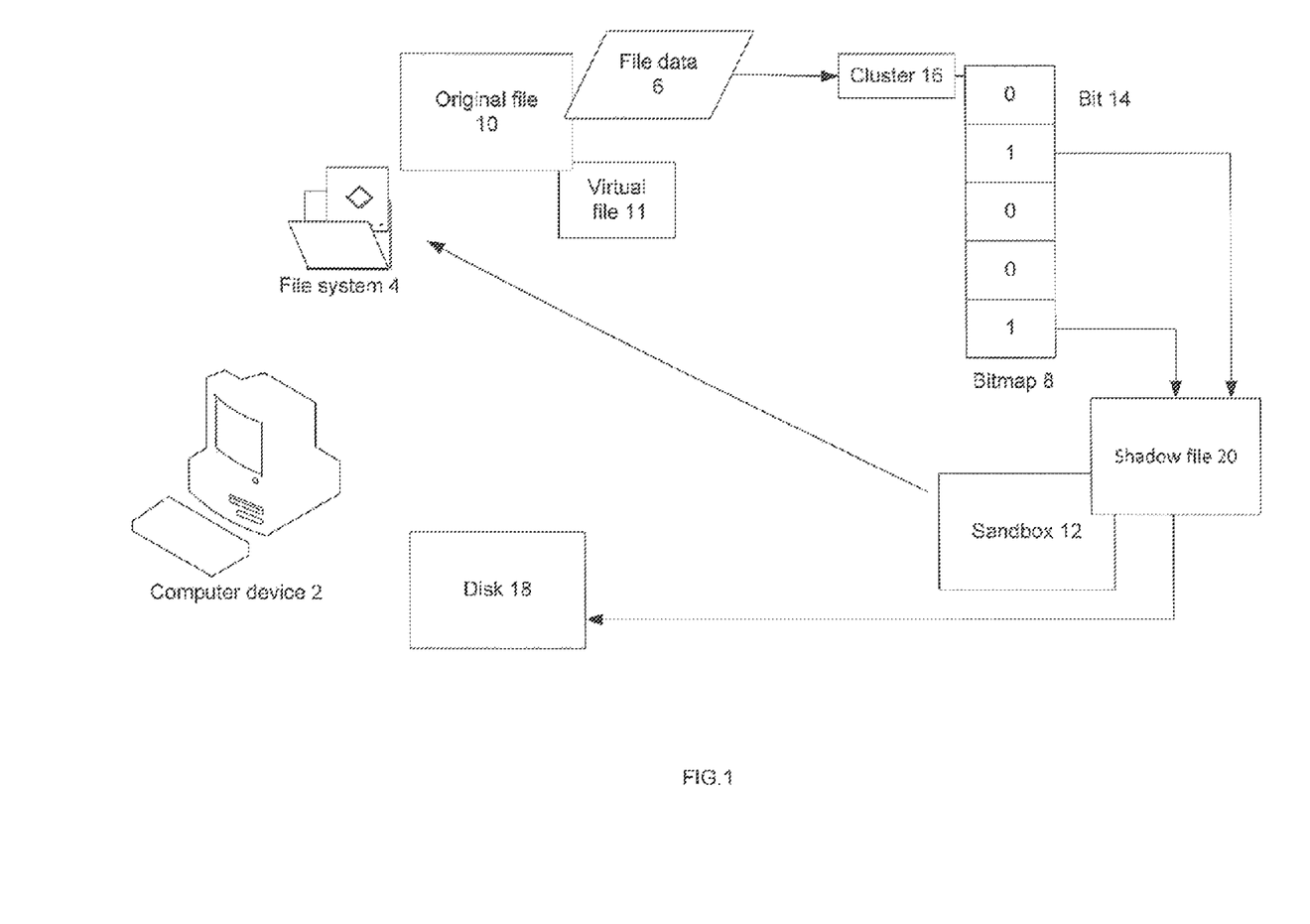
FIG. 1 is a depiction of general scheme of the invention.

In FIG. 1 the sandbox process, running on a computer device 2, is accessing file system 4; the modification of file data 6 is recorded by a bitmap 8, and only modified part of the original file 10 is redirected in sandbox 12. Bitmap 8 contains filesize or clustersize bits 14. Every bit 14 in bitmap 8 represents the redirect relationship of corresponding cluster 16. When the bitmap 8 is initially created, all bits 14 are cleared with 0, indicating the virtual file 11 same as the original one. Bitmap 8 is flushed to disk 18 as a stream file (ADS) of shadow file 20 periodically and loaded when the virtual file 11 is accessed in sandbox 12 for the first time after reboot.

Figure 2A:
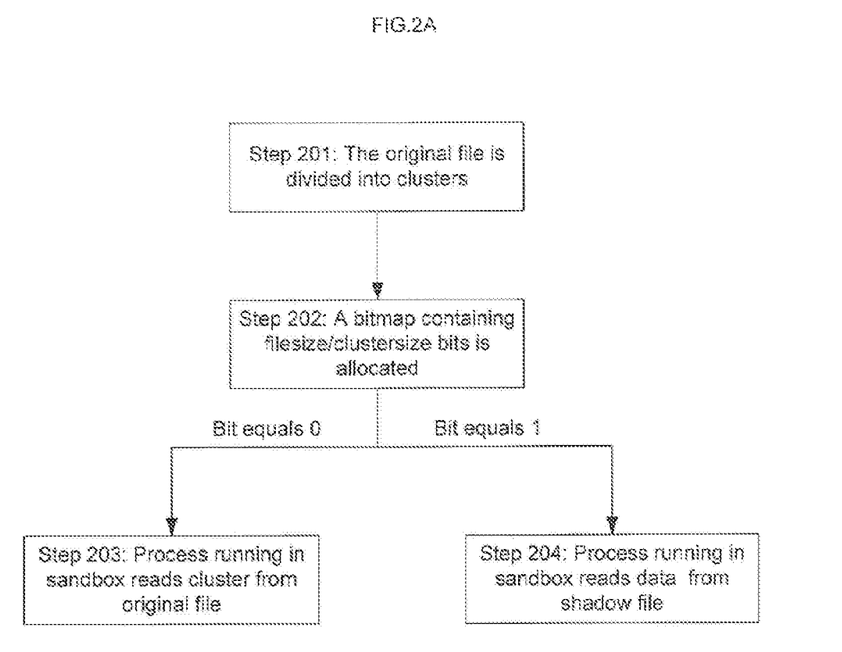
FIG. 2A is a flowchart of one embodiment of the invention where a file is modified.
Figure 2B:
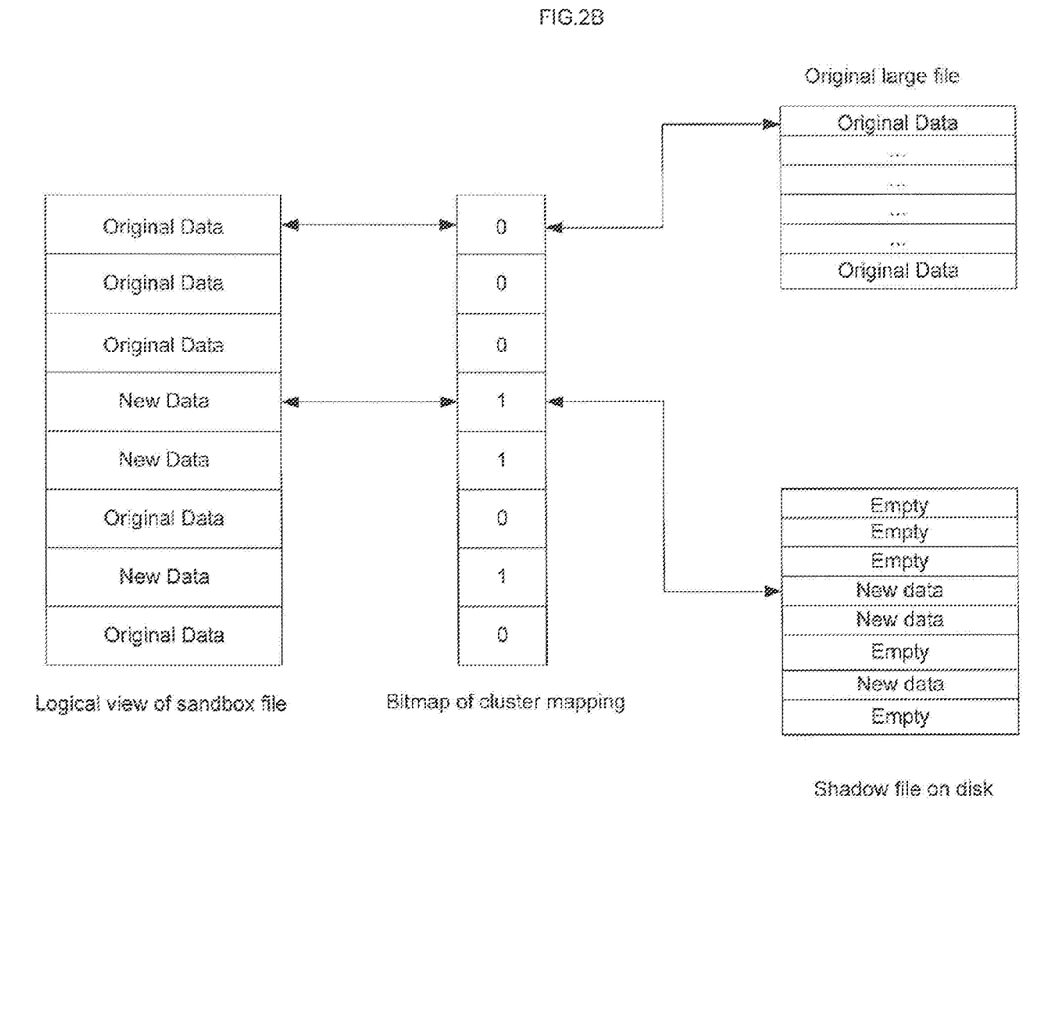
FIG. 2B is a schematic of the invention where the file is modified.

FIGS. 2A and 2B show the flowchart and the scheme of the invention where file is modified. In step 201 the original file 10 is divided into clusters 16 (a typical cluster size is 4096 bytes). In step 202 a bitmap 8 containing filesize/clustersize bits 14 is allocated. If the bit 14 is 0, step 203, it means the cluster 16 is not modified in sandbox 12 and process running in sandbox 12 should read this cluster 16 from original file 10. Otherwise, in step 204, if the bit 14 is 1, it means the cluster 16 has been changed in sandbox 12 and process running in sandbox 12 should read its data 6 from shadow file 20.

Figure 3A:
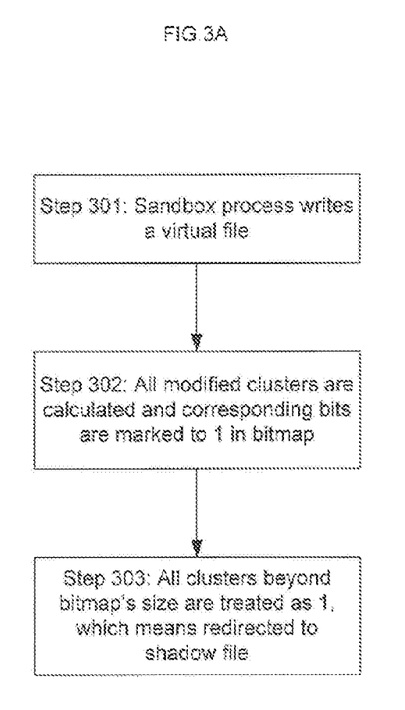
FIG. 3A is a flowchart of another embodiment of the invention where a call-back routine is written.
Figure 3B:
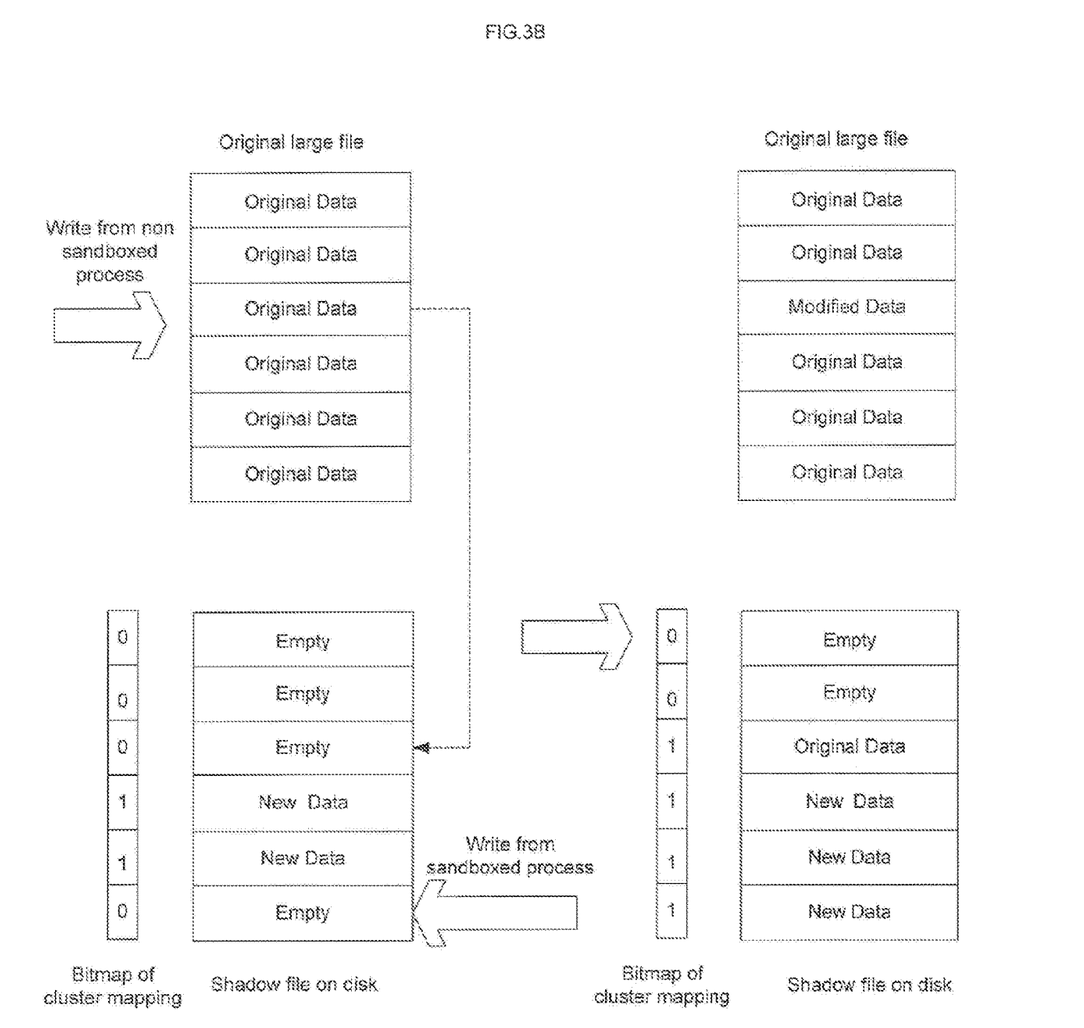
FIG. 3B is a schematic of another embodiment of the invention where a call-back routine is written.

FIGS. 3A and 3B show the flowchart and the scheme of the invention where a call back routine is written. In step 301 sandbox process writes a virtual file 11. In step 302 all modified clusters 16 are calculated and corresponding bits 14 are marked to 1 in bitmap 8, so that the following read operations will read the modified data 6 from shadow file 20. All clusters 16 beyond bitmap's size are treated as 1, which means redirected to shadow file 20, step 303. In this way, when original file 10 is appended in sandbox 12, the new data 6 is appended without changing bitmap 8.

Figure 4:
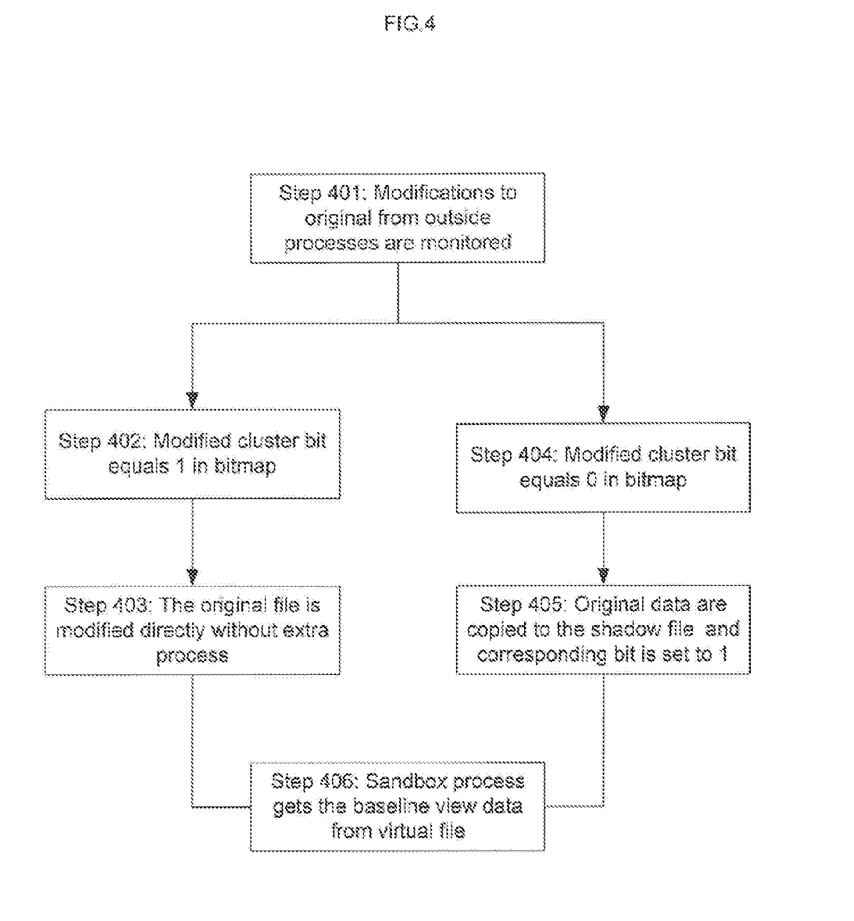
FIG. 4 is a flowchart of other embodiment of the invention where consistent baseline view of file in sandbox is provided.

In FIG. 4, a consistent baseline view of virtual file 11 in sandbox 12 is provided. The file view should not change after virtualization even if original file 10 has been changed. In step 401 modifications to original from outside processes are monitored as well. In step 402 the modified cluster bit 14 is 1 in bitmap. Thus, in step 403 the original file 10 is modified directly without extra process. In step 404 the modified cluster bit 14 is 0 in bitmap. So, in step 405 original data 6 are copied to the shadow file 20 and corresponding bit 14 is set to 1. Therefore, sandbox process gets the baseline view data from virtual file 11, step 406.

Figure 5:
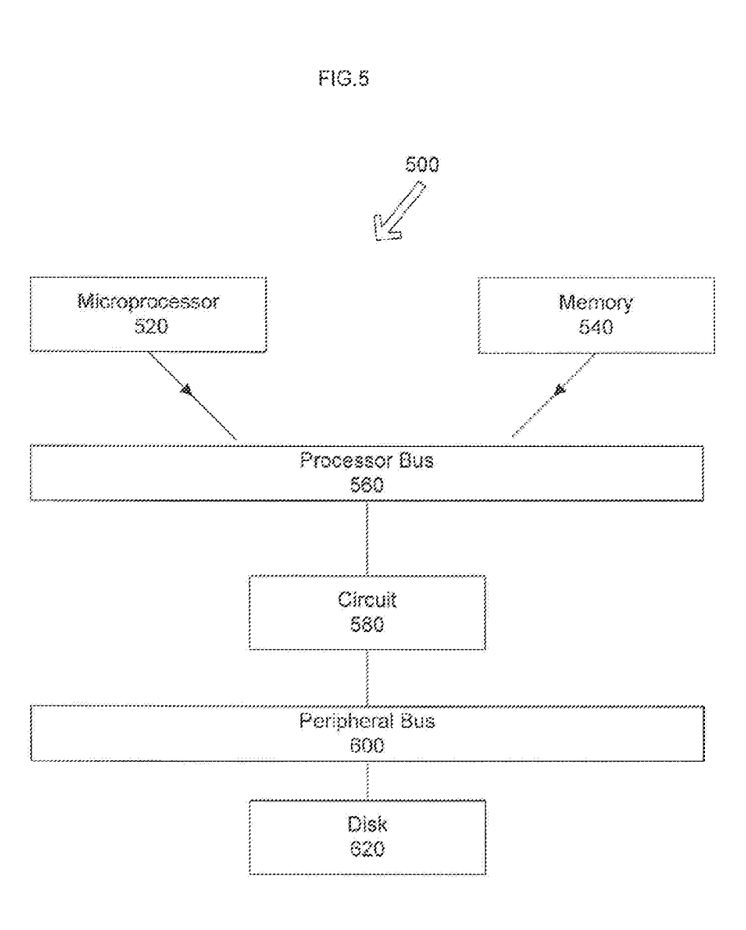
FIG. 5 is a schematic of the memory and hardware of a computer or handheld device, such as a tablet or smartphone.
Figure 8:
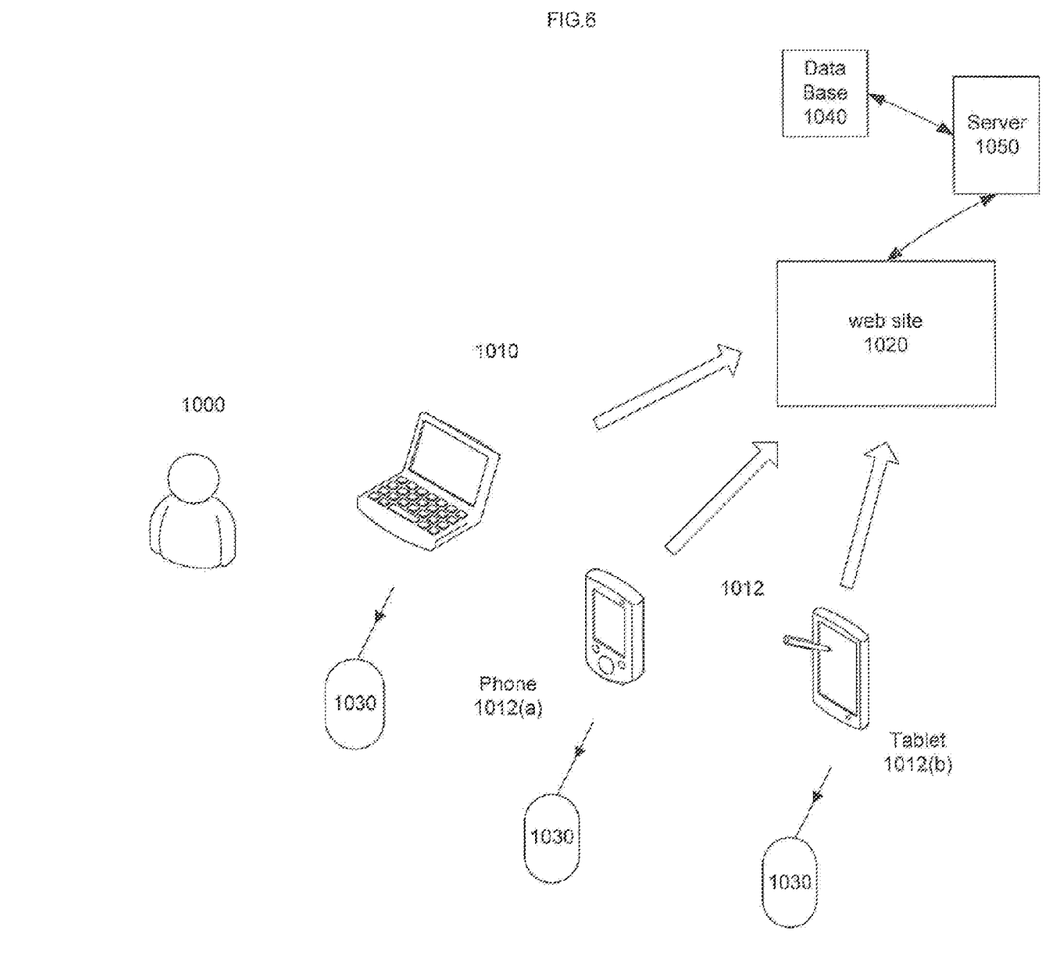

The method of the present invention may be used with computer systems and devices as shown in FIGS. 5 and 6. FIG. 5 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 6, there is a user 1000 of a computer 1010 or handheld device 1012 who accesses an Internet website 1020 with network connections to a server 1050 and database 1040. The computer 1010 or handheld device is compatible operating systems known in the art, such as Windows, iOS or android devices or android type operating systems. The user 1000 is potentially exposed to many malicious or unsafe applications located on the web or a particular website 1020 due to lack of security and validation with the source, even though the website 1020 itself may be known as reliable and trusted. The website may be an application store or directory which includes other software applications for downloading. Those of skill in the art would recognize that the computer 1010 or handheld devices 1012a or 1012b each has a processor and a memory coupled with the processor where the memory is configured to provide the processor with executable instructions. A boot disk 1030 is present for initiating an operating system as well for each of the computer 1010 or handheld devices 1012. It should also be noted that as used herein, the term handheld device includes phones, smart phones, tablets, personal digital assistants, media and game players and the like. As used throughout the specifications, the term "query" or "queries" is used in the broadest manner to include requests, polls, calls, summons, queries, and like terms known to those of skill in the art.

What is claimed is:

1. A method to provide an improved bitmap access control method of file virtualization for a large file in sandbox comprising:

running a sandbox process having a sandbox on a computer device, said sandbox process accessing a file system, said file system having an original large file with file data; a bitmap formed from division of said original large file into clusters by fixed byte counts and said bitmap containing cluster size bits;

said cluster size bits having a value of zero upon initial creation of said bitmap so a virtual file is identified as identical to said original file and building a mapping relationship between a logical view of said file in said sandbox and a physical shadow file; said bitmap flushed to a disk as a stream file of said shadow file periodically and loaded when said virtual file is accessed in said sandbox for a first time after reboot;

modifying said file data;

recording said modification of said file data by said bitmap to create a modified portion of said original file;

redirecting only said modified portion of said original file in said sandbox of the sandbox process to eliminate duplication of said file data on said shadow file and does not require duplicating said original file on said disk in order to prevent waste of disk storage;

wherein a callback routine is written by writing said virtual file by the sandbox process;

calculating modified clusters and marking corresponding bits to said modified clusters to one in bitmap so that read operations will read the modified data from the shadow file;

treating all clusters beyond said bitmap's size as one, thereby redirecting said clusters beyond said bitmap's size to said shadow file; and appending new data without changing said bitmap upon appending said original file in said sandbox.

2. The method according to claim 1, where the large file is modified comprising after dividing the large file into said clusters:

allocating said bitmap containing filesize/clustersize said cluster size bits;

defining said bit value as zero if said cluster size bit was not modified in said sandbox or as one if said cluster size bit was modified in said sandbox;

running a process in said sandbox which reads one of said clusters from said original large file if the bit value is zero; and running a process in a sandbox which reads one of said clusters from said shadow file if the bit value is one.

3. The method according to claim 1, further comprising providing a where consistent baseline view of said virtual file in the sandbox is provided comprising:

monitoring modifications to said original file from outside processes;

defining the modified cluster bit as one in said bitmap;

modifying the original file directly without extra process;

defining the modified cluster bit as zero in said bitmap;

copying original data to the shadow file and setting corresponding bit as one obtaining the baseline view data from the virtual file for the sandbox process.

* * * * *